United States Patent
Kalki et al.

(10) Patent No.: US 9,882,949 B1
(45) Date of Patent: Jan. 30, 2018

(54) DYNAMIC DETECTION OF DATA CORRELATIONS BASED ON REALTIME DATA

(71) Applicant: Amazon Technologies, Inc., Reno, NV (US)

(72) Inventors: Santosh Kalki, Seattle, WA (US); Swaminathan Sivasubramanian, Sammamish, WA (US); Srinivasan Sundar Raghavan, Mercer Island, WA (US); Timothy Andrew Rath, Des Moines, WA (US); Amol Devgan, Seattle, WA (US); Mukul Vijay Karnik, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 186 days.

(21) Appl. No.: 14/503,077

(22) Filed: Sep. 30, 2014

Related U.S. Application Data

(60) Provisional application No. 62/015,294, filed on Jun. 20, 2014.

(51) Int. Cl.
| | |
|---|---|
| *G06F 15/16* | (2006.01) |
| *H04L 29/06* | (2006.01) |
| *H04L 12/26* | (2006.01) |
| *H04L 29/08* | (2006.01) |

(52) U.S. Cl.
CPC .............. *H04L 65/60* (2013.01); *H04L 43/18* (2013.01); *H04L 67/18* (2013.01)

(58) Field of Classification Search
CPC .......... H04L 65/60; H04L 43/18; H04L 67/18
USPC ........................................................ 709/232
See application file for complete search history.

(56) References Cited

U.S. PATENT DOCUMENTS

| | | | |
|---|---|---|---|
| 8,341,111 B2* | 12/2012 | Patil ..................... | G06K 9/6253 706/12 |
| 2002/0194163 A1 | 12/2002 | Hopeman et al. | |
| 2004/0162852 A1* | 8/2004 | Qu .......................... | G06F 19/12 |
| 2005/0120018 A1 | 6/2005 | Whitney | |
| 2009/0144213 A1* | 6/2009 | Patil ..................... | G06K 9/6253 706/46 |
| 2009/0262131 A1* | 10/2009 | Suntinger .............. | G06Q 50/34 345/619 |
| 2012/0239596 A1 | 9/2012 | Lee et al. | |
| 2014/0297652 A1* | 10/2014 | Stevens ............. | G06F 17/30516 707/741 |
| 2015/0370883 A1 | 12/2015 | Kalki et al. | |

* cited by examiner

*Primary Examiner* — Phuoc Nguyen
(74) *Attorney, Agent, or Firm* — Baker & Hostetler LLP

(57) ABSTRACT

A hosted analytics system may be integrated with transactional data systems and additional data sources such real-time systems and log files. A data processing pipeline may transform data on arrival for incorporation into an n-dimensional cube. Correlation between patterns of events in transactional data may be identified. Upon arrival, new data may be transformed and incorporated into the n-dimensional cube. Similarity between the new data and a previously identified correlation may be determined and flagged.

20 Claims, 10 Drawing Sheets

DYNAMIC DETECTION OF DATA CORRELATIONS BASED ON REALTIME DATA

CROSS-REFERENCES TO RELATED APPLICATIONS

This application claims benefit under 35 U.S.C. §119(e) of U.S. Provisional Patent Application No. 62/015,294, filed Jun. 20, 2014, the contents of which are incorporated herein by reference in its entirety.

This application is also related to application entitled "EMBEDDABLE CLOUD ANALYTICS," U.S. Provisional Patent Application No. 62/015,302, filed on Jun. 20, 2014, as well as application entitled "AUTOMATED HIERARCHY DETECTION FOR CLOUD-BASED ANALYTICS," U.S. Provisional Patent Application No. 62/015,308, filed on Jun. 20, 2014, as well as application entitled "CLOUD ANALYTICS MARKETPLACE," U.S. Provisional Patent Application No. 62/015,307, filed on Jun. 20, 2014, and application entitled "DYNAMIC CUBES FOR CLOUD-BASED ANALYTICS," U.S. Provisional Patent Application No. 62/015,312, filed on Jun. 20, 2014, which are hereby incorporated by reference in their entireties.

BACKGROUND

Online analytical processing ("OLAP") and other types of data warehouse systems may be used to perform various functions related to data mining, reporting, and forecasting. These types of systems may permit multidimensional analysis of data typically obtained from transaction-oriented systems and loaded into a multidimensional cube structure, on which data analytics may be performed. Data warehouse systems may be separate and distinct from transactional systems. Data collected during operation of a transaction-oriented system may be bulk loaded periodically into a data warehouse, but the two types of systems are not tightly integrated.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed in conjunction with a hosted analytics system that is integrated with other system types, such as transactional systems. Embodiments may provide integration of various data sources in an analytics platform on or near a real-time basis. Embodiments may identify past patterns of events indicated by the data received from various data sources. Correlation between events may be identified. As new data arrives, embodiments may flag the new data if it is suggestive of a similar correlation.

Figure 1:
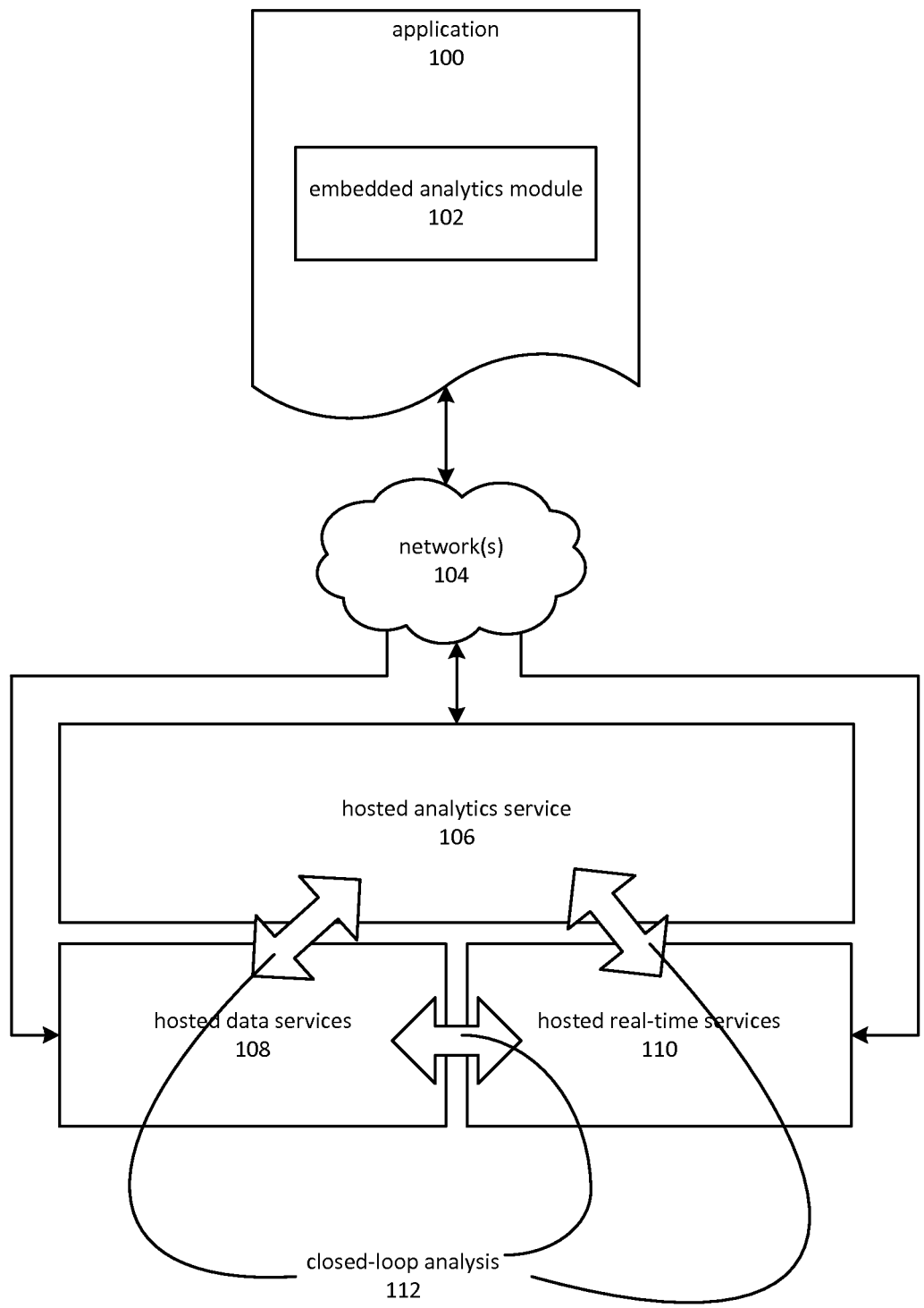
FIG. 1 is a block diagram depicting a system comprising a hosted analytics service integrated with additional hosted services, including sources of real-time and streaming data.

FIG. 1 is a block diagram depicting a system comprising a hosted analytics service integrated with additional hosted services, including sources of real-time and streaming data. An application 100 may comprise an embedded analytics module 102, which may communicate via network(s) 104 to a hosted analytics service. Application 100 may comprise additional functionality, such as functionality related to transaction processing, operations, and so forth. Examples might include order entry systems, scheduling systems, logistics systems, and so forth. An embedded analytics module 102 might be included in application 100 in order to provide insight into the operations of these various systems.

The various functions provided by application 100 may involve services hosted by a provider of hosted analytics service 106. In FIG. 1, this is depicted as interaction between application 100 and hosted data services 108, and between application 100 and hosted real-time services 110. A hosted data service 108 may comprise data repositories for maintaining historical data, transactional data, and so forth. A hosted real-time service 110 may comprise various hosted services that generate real-time data, such as gaming services, log data, and so forth. Note that although hosted data services 108 and hosted real-time services 110 are depicted as separate entities in FIG. 1, the depicted separation is only for illustrative purposes. Various embodiments may employ different arrangements, including adding additional services types.

A closed-loop analysis 112 process may be employed, in various embodiments, to provide integration between real-time and transactional data and analytical processing. The term closed-loop analysis may refer to a process for obtaining analytical insights on transactional, real-time or other rapidly changing data sets. In contrast to conventional analytics on transactional data, closed-loop analysis may, in some embodiments, be performed without performing significant amounts of bulk data transfer. A closed-loop analysis process may involve in situ probing and sampling of data maintained in hosted data services 108 or produced by hosted real-time services 110.

Figure 2A:
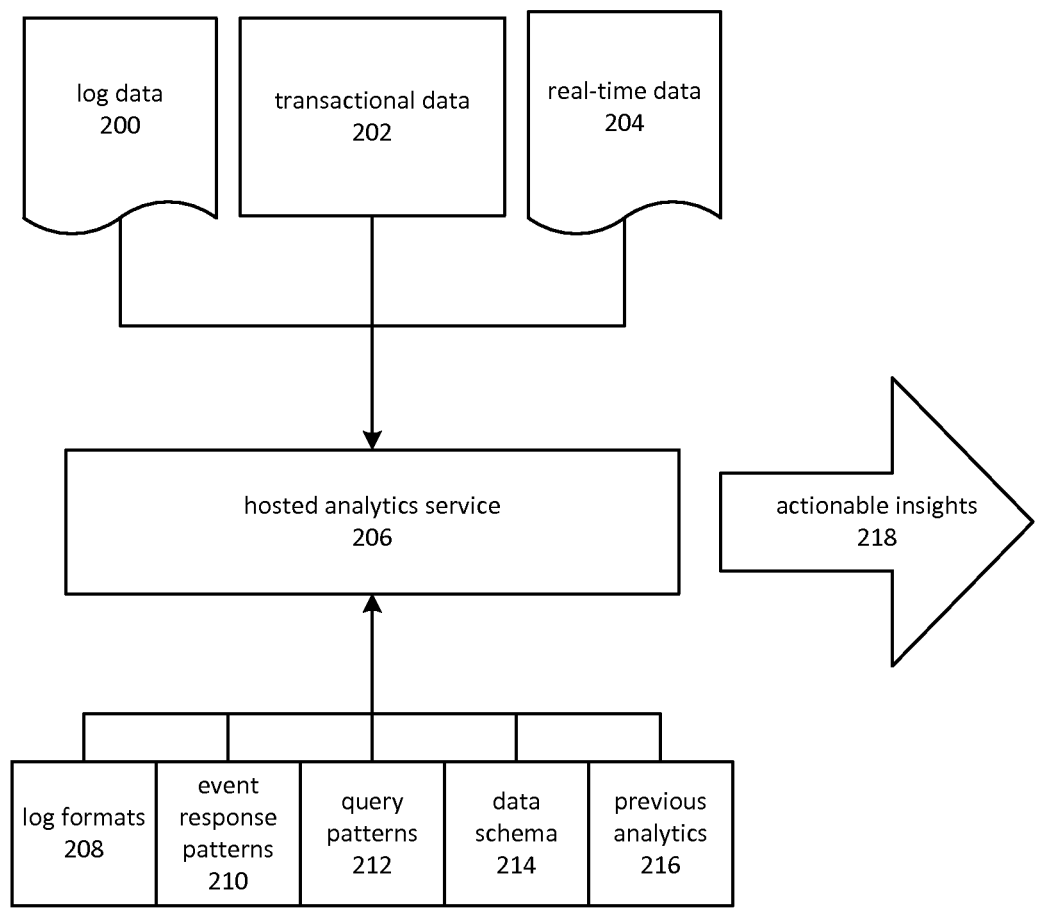
FIG. 2A is a block diagram depicting a system for performing closed-loop analysis involving a variety of hosted data services.

FIG. 2A is a block diagram depicting a system for performing closed-loop analysis involving a variety of hosted data services. Closed-loop analysis may be performed at least in part by a hosted analytics service 206.

Analytical operations may be performed on log data 200. In various embodiments, log data 200 may comprise information produced by various hosted systems and services operated by a provider on behalf of a customer. Log data 200, which may tend to be produced on an ongoing basis, may be considered a form of streaming data.

Analytical operations may also be performed on transactional data 202. In various embodiments, transactional data 202 may comprise data produced, typically on an ongoing basis, during a course of business. Non-limiting examples include point-of-sale data, account balance data, and so forth.

Analytical operations may also involve real-time data 204. Examples of real-time data include data originating from various system types that generate continuous streams of data. One non-limiting example involves massively-multiplayer video games, which may generate a stream of information related to in-game events and player behavior. Other examples include sensor data, instrument monitoring, feedback from control systems, and so forth.

Embodiments may perform closed-loop analysis on data sources such as log data 200, transactional data 202, and real-time data 204 to form actionable insights 218. An actionable insight 218 may involve detection of an event and correlation to other data. For example, recurring patterns in log data source 200 might be detected as correlating to an event that has an impact on sales, as reflected in transactional data 202. An actionable insight 218 may involve detecting that event as it is occurring, based on monitoring newly received information.

Embodiments may utilize metadata accessible to hosted analytics service 206 as a consequence of co-hosting analytics service 206 and various systems for maintaining log data 200, transactional data 202, and real-time data 204. Examples include, but are not limited to, log formats 208, event response patterns 210, query patterns 212, data schema 214, and previous analytics 216.

Embodiments may utilize log formats 208 as a basis for parsing and extracting information from log data 200. A provider of a hosted service may have access to and control or influence over log data formats, or may have access to information indicative of a log data format specified by another entity, such as a customer of the provider. Log data format may be specified as a set of rules for parsing or otherwise extracting useful information from a log file. Multiple sets of rules may be maintained for a source of log data. Each set of rules may pertain to a different event or dimension of data that might be extracted from a log file. Note that in some cases and embodiments, events or other information that may be extracted need not necessarily correspond to log data 200 on a "line-by-line" basis; instead, the information may span a number of lines. A given set of rules may be specified to detect instances of such an event.

Embodiments may also leverage event response patterns 210 to form actionable insights 218. Embodiments may monitor reactions to various events, such as events identified in log data 200, to determine typical responses to a given event. An actionable insight might then comprise a recommendation to perform a similar response. The recommendation might be accompanied by updated parameters. For example, if a response to a previous event was to execute a command line, the recommendation might contain the same command but updated so as to reflect the event that just occurred.

Embodiments may also leverage query patterns 212. This may comprise the content, frequency, results, and so forth of queries executed against data sources such as transactional data 202. Insights into possible dimensions or hierarchies may be obtained by considering frequently access column names, calculated fields, and so forth. Clauses, such as "group by" clauses, may also be suggestive of dimensions and hierarchies. Filtering clauses, such as "where" clauses, may be suggestive of dimensions and hierarchies, and may also be suggestive of an event in response to which an actionable insight might be formed. In various embodiments, data schema 214 may be used in a manner similar to query patterns 212.

Previous analytics 216 may also be used to perform closed-loop analytics. Methods of analysis previously employed—for example, analysis explicitly performed by a user of an embedded analytics application—may be automatically reapplied to data subsequently received, such as to newly added transactional data 202. Embodiments may perform scoring on a previously employed mode of analysis to determine if the result as applied to new data, is likely to be relevant or interesting to a user, and if so, to form an actionable insight 218.

As used herein, an actionable insight 218 may refer to a result of performing closed-loop analysis, such as transmitting a notification, generating a report, issuing an alarm, recommending a response, and so forth.

Figure 2B:
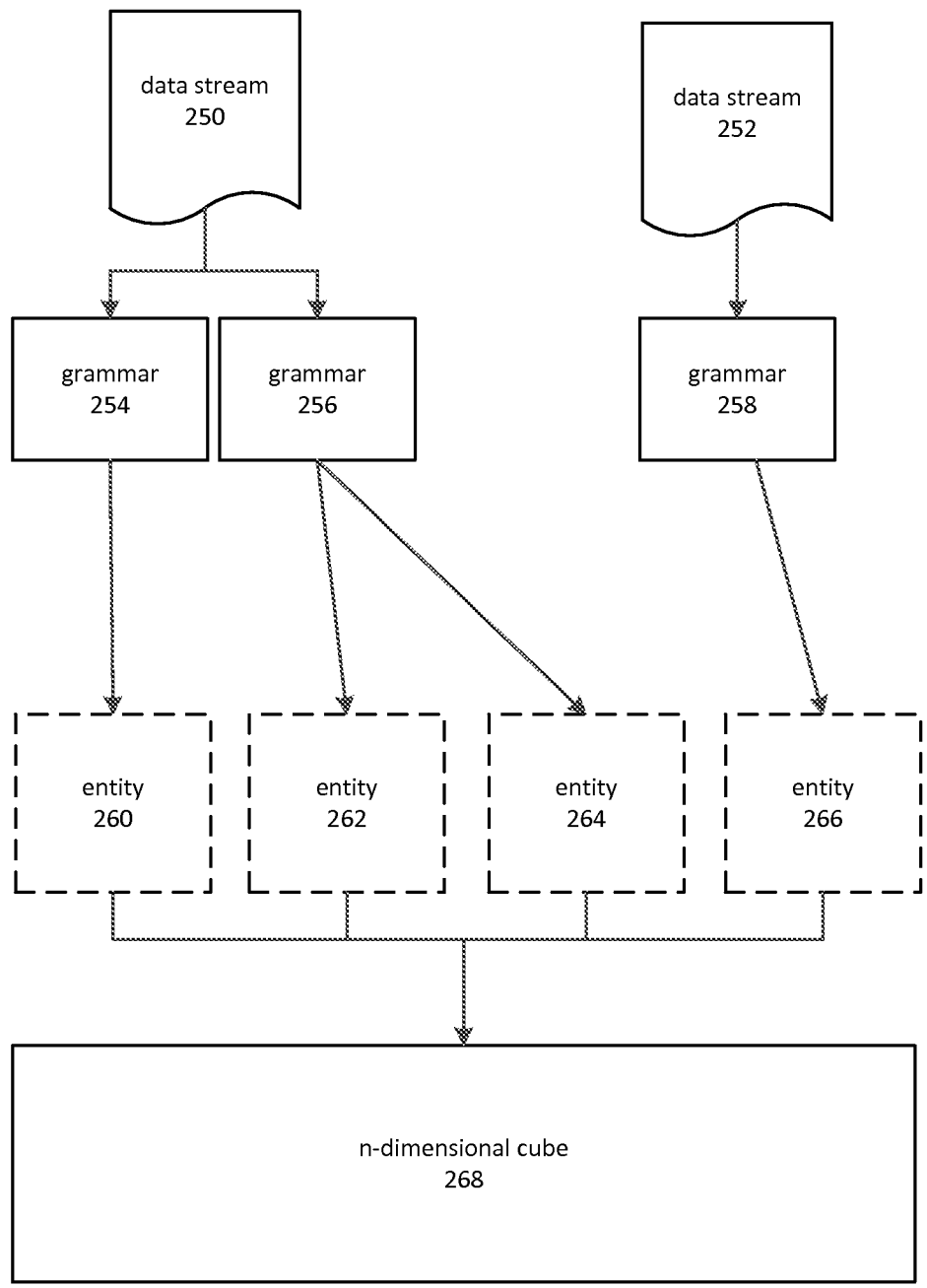
FIG. 2B is a block diagram depicting an embodiment for performing closed-loop analysis using grammars associated with data streams.

FIG. 2B is a block diagram depicting an embodiment for performing closed-loop analysis using grammars associated with data streams. FIG. 2B depicts applying grammars 254-258 to data streams 250 and 252. Application of grammars 254-258 may result in detection of entities 260-266 within the data stream.

A grammar may include various mechanisms for parsing or extracting data received from a stream of data, such as data streams 250 and 252. For example, a grammar may include computer-executable instructions for identifying and extracting values stored within a data structure layout. In some embodiments, a grammar may comprise computer-executable instructions for converting a stream of data to a stream of tokens and applying a set of rules to the tokens to extract the meaning of data received from the data stream. A grammar may, for example, comprise a lexer and parser. In some cases, a grammar may comprise a schema, such as an extensible markup language ("XML") schema.

A data stream may be associated with multiple grammars, such as data stream 250 which is associated with grammars 254 and 256. A data stream may also be associated with a single grammar, such as data stream 252 and grammar 258.

Data may be sent through a data stream on a continuous or semi-continuous basis. A grammar, such as grammars 254-258, may include instructions for extracting data from the continuous stream. In some embodiments, however, data may be transmitted as discrete packets.

Application of grammars 254-258 to data received from data streams 250-252 may result in the identification of data pertaining to entities 260-262. The data pertaining to entities 260-262 may comprise additional information about an entity already represented in n-dimensional cube 268, or it may comprise information about an entity not yet represented in n-dimensional cube 268.

An entity, such as any of entities 260-266, may include various representations of objects, persons, roles, concepts, and so on. For example, a store or product might be processed as an entity. An entity may be stored or maintained in an n-dimensional cube in a variety of ways. These ways may include a plurality of data points pertaining to the entity, such as sales figures for a particular store or product. An entity representation within an n-dimensional cube may also include various hierarchies, such as calendar-based hierarchies comprising aggregate sales figures for a store or product. Additional derived values or other attributes may also be included in a representation of an entity. Any of these various values or attributes may be considered to be a data point pertaining to an entity.

In an embodiment, a system for performing data analytics on a real time stream of data may comprise computing nodes configured to maintain an n-dimensional cube. The n-dimensional cube may be supplied data through a data processing and cleansing pipeline including at least one associated grammar. The grammar may be applied to the pipeline to at least partially populate the n-dimensional cube with data points related to information pertaining to various entities. Additional data points, such as aggregates and other derived values, may be calculated based on the initial population of data points.

Embodiments may, by applying a grammar to a stream of data, detect an entity that has not yet been added to an n-dimensional cube. The new entity may be added to the n-dimensional cube in a manner that leverages existing structure and analysis of existing entities. If a first entity is assumed, for illustrative purposes, to exist in an n-dimensional cube, then a second entity that is of the same class as the first may be added to an n-dimensional cube by leverage structure and analysis applied to the first entity. In other words, entities of the same class may, in some cases, utilize similar structures and analysis. Structure may refer to hierarchies, derived values, dependencies and so forth.

A hierarchy applied to a first entity may be cloned or adapted for use with a second entity. For example, if a first entity contains a hierarchy based on a fiscal year starting on June $1^{st}$, a second entity may be represented in an n-dimensional cube using a second hierarchy that also is based on a fiscal year starting on June $1^{st}$.

Calculation of data points pertaining to a new entity may be deferred. Deferring computation of the data points may permit improved access times for computations more frequently utilized, or for computations used to identify various inferences. In an embodiment, access patterns for data points associated with a first entity may be identified. Computation of data points associated with a second entity may be priorities based on the access patterns.

Embodiments may identify a calculation used to form a data point associated with the first entity, and then form a data point associated with the second data point based on the identified calculation. For example, a derived value applied to a first entity may also be calculated for a second entity. Embodiments may, in some cases, prioritize computation of data points used as input to the calculation of the derived value.

Reuse of various structures and calculations may, as noted, be based on two entities being of the same class, or of a similar class. A class may generally refer to a category of person, place, object, or concept. A class may in some cases possess a set of attributes whose value may vary, but that are descriptive of various qualities of members of the class. For example, a product may have a "color" attribute whose actual value may vary.

In an embodiment, priority for calculating data points related to an entity already represented in an n-dimensional cube may be lowered upon the addition of a new entity of the same class. This approach may be used in cases where an existing entity may be presumed to be of less interest than a new entity.

In an embodiment, a trend, correlation, or other inference may be identified in data points associated with an entity represented in an n-dimensional cube. Data points associated with the second entity may be prioritized for computation based on corresponding data points of the first entity being used to identify the inference.

An inference may be identified in a first plurality of data points associated with an entity. Examples of inferences include, but are not limited to, the following examples: correlations between the first plurality of data points and additional data in the n-dimensional cube, such as a correlation between store sales and promotions; correlations between the first plurality of data points and transactional data; correlations between a trend in the first plurality of data points and additional data points, correlation between trends; and so on.

In an embodiment, a computing node may be represented as an entity in an n-dimensional cube. Data corresponding to a new computing node may be fed through a data stream. A grammar associated with the data stream may extract the data and add a corresponding entity to the n-dimensional cube, using techniques and mechanisms as presented herein. The new computing node may then be represented in to the n-dimensional cube by the addition of hierarchies, derived values, and other structure similar to that already used with the first computing node.

In an embodiment, a service (such as a web service, hosted database management system, business objects, and so forth) may be represented in an n-dimensional cube and may supply operational data to a stream of data processing inputs to the n-dimensional cube. An additional service, upon beginning operation, may supply data to the stream of data. A grammar associated with the stream may extract data pertaining to the new service and determine that the additional service is not yet represented in the n-dimensional cube. The new service may then be represented in the n-dimensional cube by the addition of hierarchies, derived values, and other structure similar to that already used with the first service.

Various modes of analysis may be used to form inferences concerning an entity represented in an n-dimensional cube. In some embodiments, access patterns for data points related to an entity might be employed to form inferences. Access patterns may include read operations and/or write operations. Read operations may be indicative of interest in the data by various users of the analytical system. Write patterns may be indicative of trends or correlations that may be found within the data. For example, a high frequency of writes associated with a particular entity may indicate possible inferences related to the entity. For example, a relatively high frequency of writes might begin to be associated with a product entity. This might indicate increased interest in or sales of the product, and may be used to trigger further analysis in order to identify correlations between the increased write frequency and some other factor, such as an advertising campaign or some other event.

Embodiments may identify a trend in data points related to a first entity, and compare that trend to data points related to a second entity. For example, embodiments might detect that sales in a first store have been trending upwards, but that sales in a second store have been trending downward. Upon the addition of a new entity to an n-dimensional cube, embodiments may prioritize computation of data points needed to determine if the trend exists.

More generally, embodiments may compare deviations in inferences based on data points related to a first entity to data points related to a second entity. Embodiments may, for example, determine that a correlation involving data points related to a first entity no longer applies to data points related to a second entity. Deviations in inferences may act as triggers for further analysis. The deviations might be flagged for review by a user of the n-dimensional cube. Priorities for computing data points may also be based on the deviation—for example those data points directly or indirectly related to the deviation might be prioritized. This might, for example, include prioritizing calculation of data points related to a third entity of the same class of entities, so that further examination of the potential deviation might be enabled. This approach may be used to avoid long delays in computing hierarchies or other derived values, which may typically be seen in other analytical systems.

Figure 3:
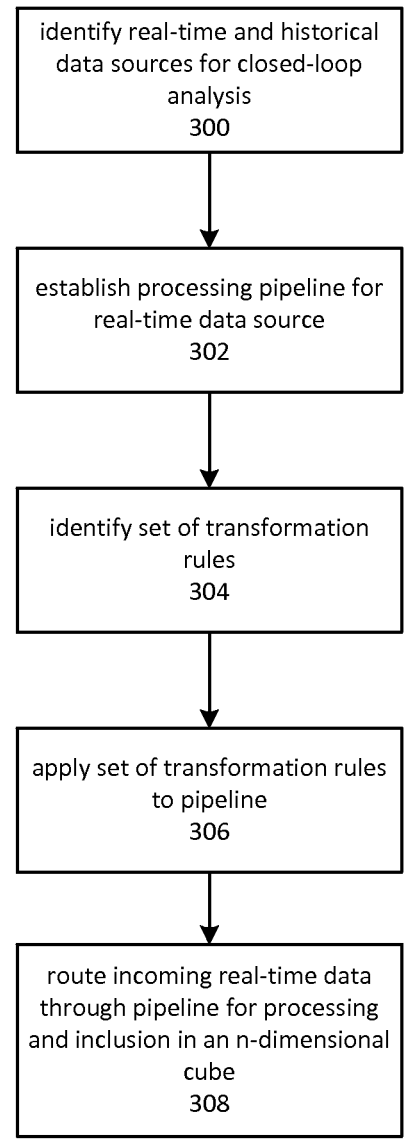
FIG. 3 is a flowchart depicting an embodiment of a process for incorporating real-time and log-based data into a hosted analytics system.

FIG. 3 is a flowchart depicting an embodiment of a process for incorporating real-time and log-based data into a hosted analytics system. Although depicted as a sequence of operations, those of ordinary skill in the art will appreciate that the depicted order should not be construed as limiting the scope of the present disclosure, and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 300 may involve identifying real-time and historical data sources on which closed-loop analysis is to be performed. In some embodiments, these sources may be explicitly selected. Other embodiments might perform automated selection based on detected correlations. For example, a spike in error events might be correlated to a rise in sales activity on an e-commerce web site. Data mining might reveal the correlation between certain transaction and log data sources; consequently, those sources could be identified as targets for closed-loop analysis.

Operation 302 depicts establishing a pipeline for processing information to be incorporated into closed-loop analysis, including real-time and log-based data sources. A pipeline may be established for each data source. In general terms, a pipeline may comprise a series of computer-executable instructions and/or circuitry for transforming real-time data in preparation for analysis.

Operation 304 depicts identifying a set of transformation rules to apply to data in a pipeline. Transformation rules may be identified based on the identity and content of the data source to which the pipeline is being applied. Transformation rules may also be based on the identity and content of other data sources to be used in conjunction with the pipelined data source. An object of the transformation is to cleanse and/or normalize data to a format suitable for dimension and hierarchy modeling and analysis. Embodiments may select sets of transformation rules so that the output of respective pipelines is consistent for dimension and hierarchy modeling and analysis. Examples of transformation rules may include stemming, lemmatization, categorization, quantization, and so on.

Operation 306 depicts applying an identified set of transformation rules to data as it flows through a transformation pipeline. Data may be transformed on an ongoing basis rather than modifying the data where it is stored. Data flowing from the pipeline may be processed and stored in various forms, such as summarized or partially summarized forms, within an n-dimensional cube structure. Embodiments may store a transformed version of data only where needed to form the desired set of dimensions and hierarchies.

The set of transformation rules applicable to a pipeline may evolve over time. A change in a set of transformation rules may result from adopting or rejecting various dimension and hierarchy models. Embodiments may therefore form subsequent generations of transformation rules by adding additional transformations for enabling computation of a given hierarchy and dimension model, and removing transformations no longer needed.

Operation 308 depicts routing incoming data through a pipeline for processing and inclusion in an n-dimensional cube. As noted, the transformed data may be used to form dimension and hierarchy models, including population of dimension and hierarchy models. A plurality of data sources may feed the population of a single n-dimensional cube. Embodiments may maintain associations between transformation pipelines and destination n-dimensional cubes.

Figure 4A:
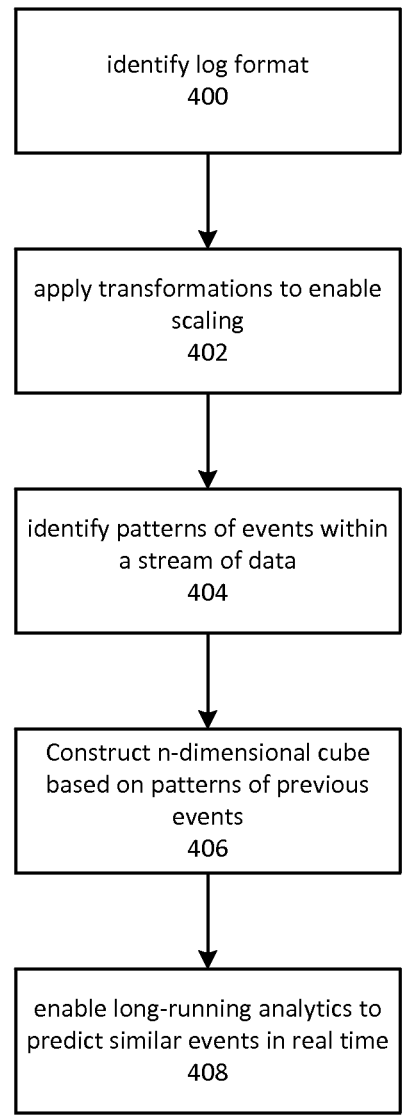
FIG. 4A is a flowchart depicting an embodiment of a process for performing closed-loop analysis on log-based data.

FIG. 4A is a flowchart depicting an embodiment of a process for performing closed-loop analysis on log-based data. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 400 depicts identifying a log format for a log-based data source for which closed-loop analytics is to be performed. As noted herein, a provider of a hosted analytics system also hosting transactional and/or operation systems of the same customer may have control or access to log formats used by those systems. In some embodiments, information indicative of a log format may be transmitted to the hosted analytics system. In some embodiments, log format may be expressed as a grammar, set of rules, or other such mechanisms. Embodiments may maintain a repository of log format descriptions, such as grammars, which may be applied to various data sources. Log format descriptions may also be shared between users, developers, and application publishers.

Log data may sometimes be differentiated from other types of data in that it may contain large amounts of data, much of which may be unnecessary for performing a desired set of analytical functions. Log data may also contain large amounts of duplicative data. Processing of log data may therefore be challenging to perform at scale, particularly in a hosted environment where multiple services may operate. In various embodiments, transformation rules may be applied to enable scaling, as depicted in operation 402. Embodiments may apply transformation rules to log data to enable scaling, for example by performing map-reduce operations on relevant log information. Transformation rules may also be used to extract or sample log data to reduce data quantities.

Operation 404 depicts identifying patterns of events within a stream of data or a repository of data, such as a log file. Embodiments may identify single entries or patterns of entries that may represent events. Embodiments may further correlate events in log data to other patterns in historical data, such as transactional data. For example, an error in a log file might be correlated to a particular day of the week, to the level of sales per unit of time exceeding a threshold level, and so on. These correlations may be identified as insights, which may be further evaluated and may be presented to a user for identifying the insight as one which the user is interested.

Operation 406 depicts constructing and maintaining an n-dimensional cube based on the identified patterns and insights. Data may be modelled according to various dimensions and hierarchies, and stored in an n-dimensional cube for use in forming actionable insights when similar patterns begin to recur. Operation 408 depicts enabling a long-running analytics process to predict similar events in real time. For example, embodiments may execute repeated queries against the n-dimensional cube created in operation 406 to detect a pattern of log file events similar to those identified in operation 404. Embodiments may base predictions on partial data sets or recently received data, and may base predictions on data received in real time. Embodiments may perform queries in a manner so that latency is below a threshold needed for the results of the query to be actionable. This may be in contrast to conventional data warehousing systems, in which query latency may be high. For example, in some data warehousing systems, transactional or operational data may be transferred to a data warehouse for analytical processing on an infrequent basis, such as nightly. Query latency in these cases may be considered to be high. Embodiments of the present invention may have relatively low latency due to integration between transactional data, real-time data, log data, and dimensional/hierarchical data maintained in one or more n-dimensional cubes. This integration may be accomplished, in various embodiments, through the use of data transformation pipelines and continuously updating n-dimensional cubes.

Figure 4B:
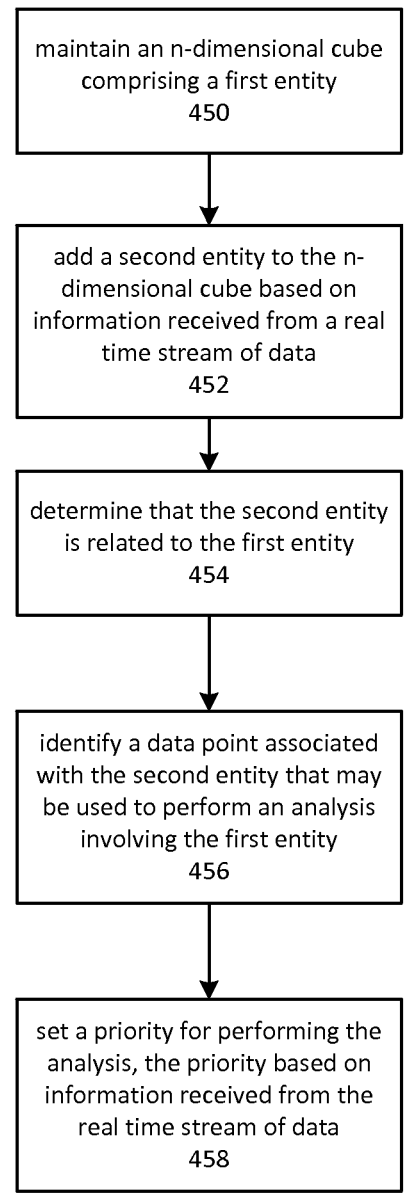
FIG. 4B is a flowchart depicting an embodiment of a process for performing closed-loop analysis involving information received from a real time stream of data.

FIG. 4B is a flowchart depicting an embodiment of a process for performing closed-loop analysis involving information received from a real time stream of data. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Embodiments may, as depicted by operation 450, maintain an n-dimensional cube comprising a first entity. The entity may be associated with various data points stored within the n-dimensional cube, such as data points corresponding to a hierarchy. The entities may also be associated with various attributes. Various methods or techniques of analysis might be applied to the data points and/or attributes associated with an entity. In some cases, additional analysis might be enabled based on data received from a real time stream of information.

Embodiments may, as depicted by operation 452, add a second entity to an n-dimensional cube based on information received from a real time stream of information. A grammar may be applied to a real time stream of information in order to extract a subset of the information that pertains to a particular entity, such as the second entity.

Operation 454 depicts an embodiment determining that the second entity is related to the first entity. Entities may be related based on a variety of factors. In some cases, entities may belong to the same class of entities, or have a common parent class. In some cases, entities may share related attributes. For example, a first entity might comprise a store with a geographic location, while a second entity might represent a person whose current geographic location is the same as, or near, the store's location. In some cases, entities may be related based on a statistical correlation. For example, it might be determined that a person whose income falls within a certain range is related to a certain category of product that is typically purchased by others whose income falls within the same range.

Embodiments may, as depicted by operation 456, identify a data point associated with the second entity that may be used to perform an analysis involving the first entity. For example, the second entity might represent a customer with a current geographic location. The geographic location might then act as a pivot point in an analysis involving the first entity.

As depicted by operation 458, embodiments may set a priority for performing an analysis based on information received in the real time stream of data. For example, an analysis might be prioritized in proportion to a customer's proximity to a store. Embodiments may utilize information from the second entity to determine relative priority between analyses that might be performed on each of two entities. For example, an entity linked to a customer who is near the entity might be prioritized for analysis over an entity linked to a customer who is more distant. In the case of log files and other operational data, information indicative of a high error frequency, a high throughput rate, and so forth may be the basis of prioritizing analysis involving entities related to or dependent on a system associated with the operational data.

Figure 5A:
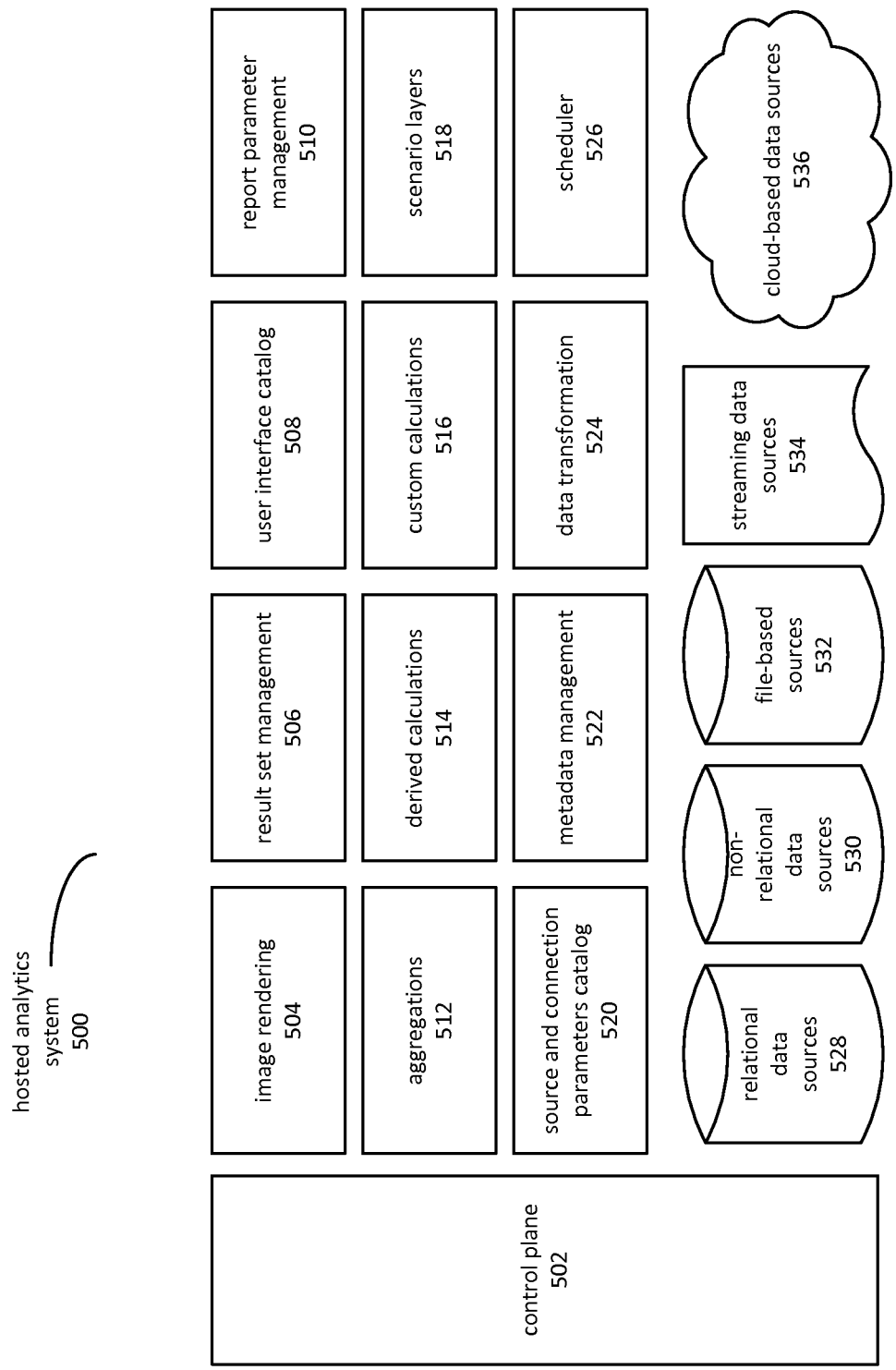
FIG. 5A is a block diagram depicting an embodiment of a system for providing hosted analytics services.

FIG. 5A is a block diagram depicting an embodiment of a system for providing hosted analytics services. A hosted analytics system 500 may be managed by a control plane 502 that coordinates activities of various modules of the system.

An image rendering 504 module may provide rendering services for embedded user-interface components such as graphs and charts. A result set management 506 module may maintain history information, data caches, and so forth pertaining to results of performing analysis. A user interface catalog 508 module may maintain a repository of user interface elements for embedded analytics, such as images and so forth that might be inserted in the user interface of an application that includes embedded analytics features. A report parameter management 510 module may comprise a repository of parameters to be used in generating analytical reports, such as time periods, geographic region, dimensions to include in a report, desired drill-down levels, and so on.

An aggregations 512 module may perform operations to calculate aggregate values in various dimensions and combinations of dimensions. For example, aggregations 512 module may calculate monthly, weekly, and daily sales data for a particular store, geographic region, and state.

A derived calculations 514 module may perform second order calculations based on aggregate data and other information. A custom calculations 516 module may perform report-specific or user-provided calculations. Custom calculations may be provided, for example, by an application publisher.

A scenario layers 518 module may perform operations related to simulations, projections or other types of "what-if" scenarios. These may be custom scenarios provided, for example, by an application publisher.

A source and connection parameters catalog 520 may maintain information used to locate and connect to various information sources. Information for locating sources may include network address, uniform resource locators ("URLs") and so forth. Information for connecting may include various forms of credentials, accounts, user names, and so forth.

A metadata management 522 module may maintain various forms of metadata and other information used in interfacing with various data sources, such as relational data sources 528, non-relational data sources 530, file-based sources 532, streaming sources 534, and cloud-based sources 536. Embodiments may employ metadata from metadata management 522 module in conjunction with data transformation 524 module. Data transformation 524 module may perform data transformation and data cleansing operations on incoming data.

A scheduler 526 module may coordinate timing of various activities performed by hosted analytics system 500. The coordination may involve scheduling n-dimensional cube rebuilding, scheduling data retrieval and so forth.

Various data sources may be employed. These include relation data sources 528 such as relational database management systems based on structured query language ("SQL"), as well as non-relational data sources 530. Various non-relational data sources 530 may include database systems sometimes referred to as NoSQL databases, key-value pair databases, object-relational databases and so forth. Various file-based sources 532 may be used, such as document repositories, log files, and so forth. Log files may also be treated as streaming sources 534, which may also include other types of data sources in which data may be updated on an ongoing basis. Additional examples of streaming data sources 534 include data generated from videogames, such as multi-player video games.

Various types of cloud-based data sources 536 may be used. These may include various web sites or data sources maintained by a provider of hosted analytics services, an application publisher, a user of an application, or a third party.

Figure 5B:
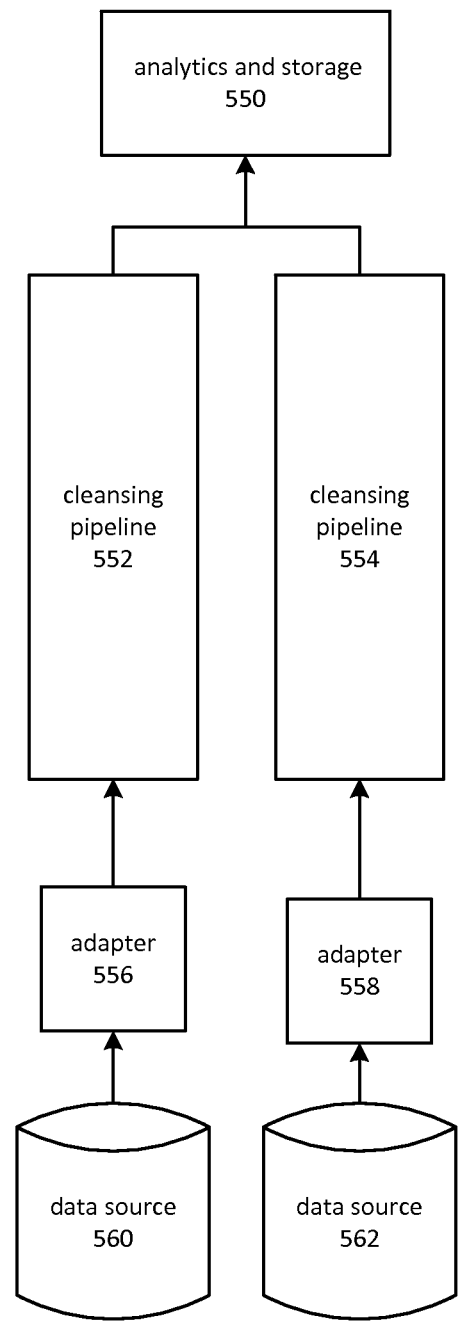
FIG. 5B depicts a process for intake and processing of data from real-time data sources.

FIG. 5B depicts a process for intake and processing of data from real-time data sources. A data source 560 may be communicatively coupled to an adapter 556 and a cleansing pipeline 552. Additional data sources may be communicatively coupled to other adapters and pipelines, such as adapter 558 and cleansing pipeline 554.

An adapter 556 may transform data from data source 560 to a format suitable for processing by cleansing pipeline 552. Operations performed by cleansing pipeline 552 may include performing one or more translations or transformations on incoming data. Examples include stemming, lemmatization, and so forth. A cleansing pipeline 552 may be multiplexing. This may include performing cleansing along multiple paths in order to produce data in a normalized format that matches a normalized format used in each destination n-dimensional cube.

FIG. 5B depicts an analytics and storage 550 module. This may refer to various components for performing analytics, such as modules 502-526 in FIG. 5A. Cleansed data incoming from cleansing pipelines 552 and 554 might be processed by an analytics and storage 550 module. The processing might include operations such as performing aggregation, performing custom calculations, scenario modeling, and so forth. Data from cleansing pipelines 552 and 554, as well as any calculated or derived values, may be routed and stored in an appropriate n-dimensional cube.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as SQL, while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 6:
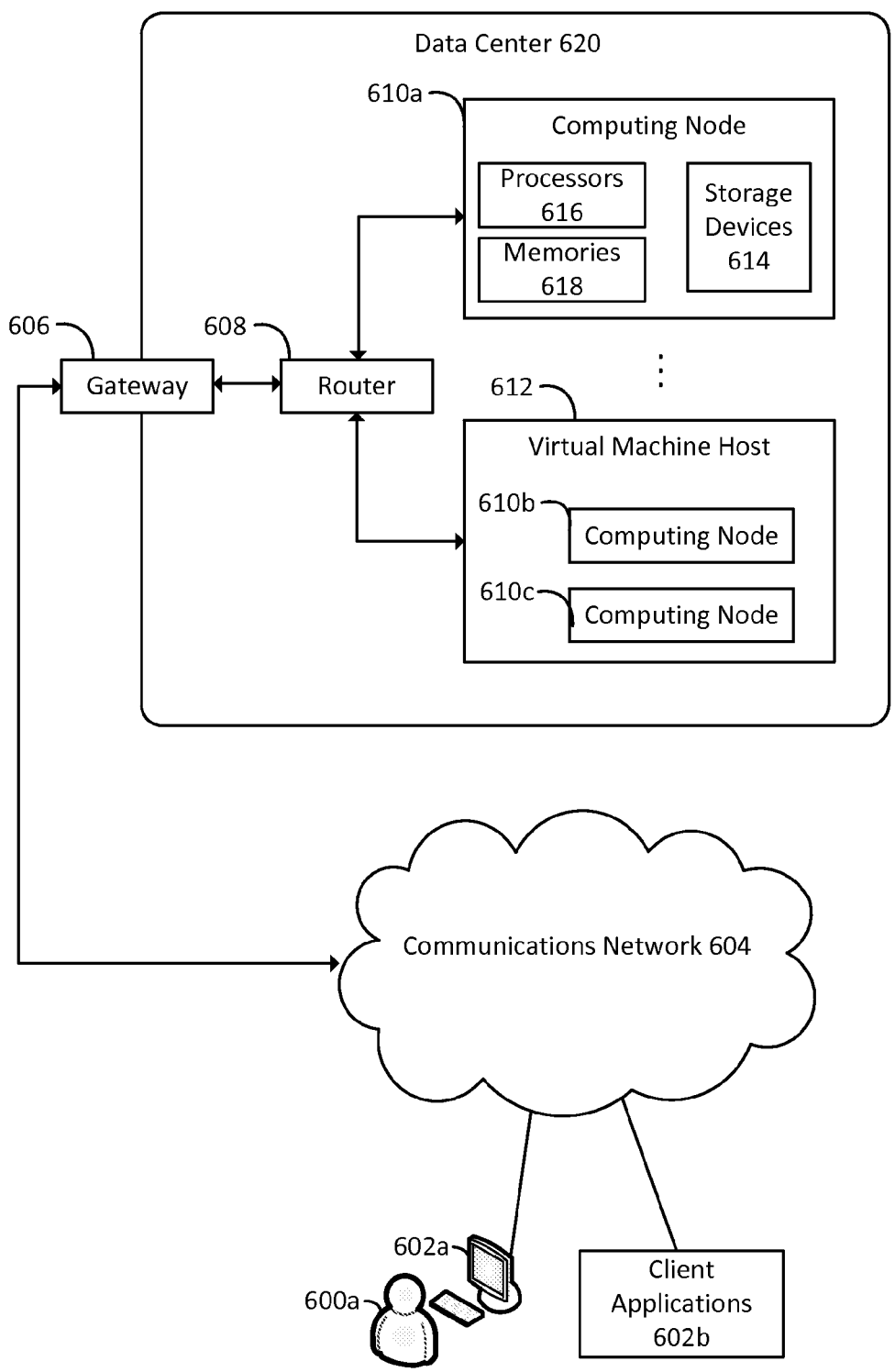
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600*a* may interact with various client applications, operating on any type of computing device 602*a*, to communicate over communications network 604 with processes executing on various computing nodes 610*a*, 610*b*, and 610*c* within a data center 620. Alternatively, client applications 602*b* may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610*a*, 610*b*, and 610*c*, operating within data center 620, may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610*a*, 610*b*, and 610*c*. Some of these intermediate layers may themselves comprise processes executing on one or more of the computing nodes. Computing nodes 610*a*, 610*b*, and 610*c*, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610*a* is depicted as residing on physical hardware comprising one or more processors 616, one or more memories 618 and one or more storage devices 614. Processes on computing node 610*a* may execute in conjunction with an operating system or alternatively may execute as a bare-metal process that directly interacts with physical resources, such as processors 616, memories 618, or storage devices 614.

Computing nodes 610*b* and 610*c* are depicted as operating on virtual machine host 612, which may provide shared access to various physical resources, such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

In at least some embodiments, a server that implements a portion or all of one or more of the technologies described herein may include a general-purpose computer system that includes or is configured to access one or more computer-accessible media.

Figure 7:
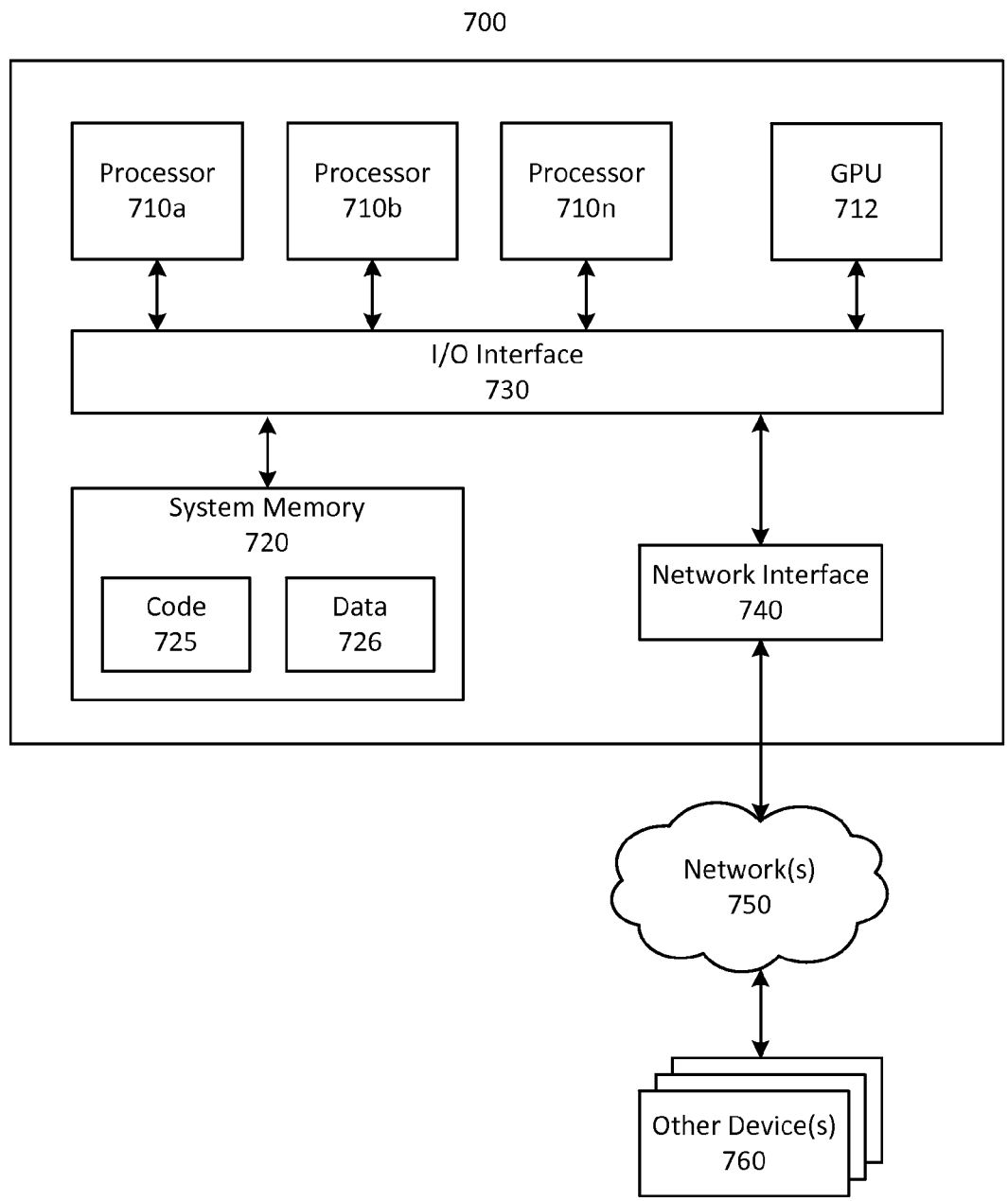
FIG. 7 is a block diagram depicting an embodiment of a computing system on which aspects of the present disclosure may be practiced.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone, (which may also be referred to as an availability container), in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and/or low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments, or that one or more embodiments necessarily include logic for deciding with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more memories having stored thereon computer readable instructions that, upon execution by a computing device, cause the system at least to:
store a first data point associated with a first entity;
receive information indicative of a second entity, wherein the second entity is identified based at least in part on applying a grammar to a subset of the data received from a real time stream of data;
determine that the second entity is related to the first entity;
identify a second data point associated with the second entity, the second data point corresponding to the first data point, wherein the first data point is input to a first analysis involving the first entity; and
calculate a value for the second data point, according to a priority for performing a second analysis, the priority based at least in part on the identification of the second entity in the subset of the data received from the real time stream of data and the determination that the second entity is related to the first entity.

2. The system of claim 1, further comprising one or more memories having stored thereon computer-readable instructions that, upon execution by the computing device, cause the system at least to:
cause a service, upon deployment, to supply operational data to the real time stream of data; and
detect the second entity based at least in part on applying the grammar to the operational data received from the real time stream of data.

3. The system of claim 1, wherein the analysis comprises identifying a pattern of frequent additions to data points associated with the first or second entity.

4. The system of claim 1, further comprising one or more memories having stored thereon computer-readable instructions that, upon execution by the computing device, cause the system at least to:
identify a deviation between a first inference based on the analysis and an additional inference based on an additional analysis of an additional entity belonging to a same class of entities as the first entity.

5. The system of claim 1, wherein the at least one attribute relating the first and second entities comprises a location.

6. The system of claim 5, further comprising one or more memories having stored thereon computer-readable instructions that, upon execution by the computing device, cause the system at least to:
determine the priority for performing the second analysis based at least in part on the location.

7. A non-transitory computer-readable storage medium having stored thereon instructions that, upon execution by one or more computing devices, cause the one or more computing devices at least to:
identify a second entity based at least in part on applying a grammar to a subset of data received from a real time stream of data;
determine that the second entity is related to a first entity;
identify a data point associated with the second entity, the data point corresponding to another data point associated with the first entity, wherein the another data point is an input to a first analysis involving the first entity; and
calculate a value for the data point, according to a priority for performing a second analysis, the priority based at least in part on the identification of the second entity in the subset of data received from the real time stream of data and the second entity being related to the first entity.

8. The non-transitory computer-readable storage medium of claim 7, comprising further instructions that, upon execution by the one or more computing devices, cause the one or more computing devices to at least:

cause a second service, upon deployment, to supply operational data to the real time stream of data; and detect the second entity based at least in part on applying the grammar to the operational data received from the real time stream of data.

9. The non-transitory computer-readable storage medium of claim 7, comprising further instructions that, upon execution by the one or more computing devices, cause the one or more computing devices to at least:

identify a deviation between a first inference based on the first analysis and an additional inference based on the second analysis, wherein the second entity belongs to a same class of entities as the first entity.

10. The non-transitory computer-readable storage medium of claim 7, wherein the at least one attribute relating the first and second entity comprises a location.

11. The non-transitory computer-readable storage medium of claim 10, comprising further instructions that, upon execution by the one or more computing devices, cause the one or more computing devices to at least:

determine the priority for performing the second analysis based at least in part on the location.

12. The non-transitory computer-readable storage medium of claim 7, wherein determining that the second entity is related to the first entity comprises identifying a statistical correlation between an attribute of the first entity and an attribute of the second entity.

13. The non-transitory computer-readable storage medium of claim 7, wherein the second entity corresponds to an event.

14. A computer-implemented method, comprising:

identifying a second entity based at least in part on applying a grammar to a subset of data received from a stream of data;

determining that the second entity is related to a first entity;

identifying a data point associated with the second entity, the data point corresponding to another data point associated with the first entity, wherein the another data point is an input to a first analysis involving the first entity; and calculating a value for the data point, according to a priority for performing a second analysis, the priority based at least in part on the identifying of the second entity in the subset of data received from the stream of data and the determining that the second entity is related to the first entity.

15. The method of claim 14, wherein the first entity corresponds to a first computing node and the second entity corresponds to a second computing node.

16. The method of claim 14, further comprising:

identifying a deviation between a first inference based on the first analysis and an additional inference based on the second analysis, wherein the second entity belongs to a same class of entities as the first entity.

17. The method of claim 14, wherein the at least one attribute relating the first and second entities comprises a location.

18. The method of claim 17 further comprising:

determining the priority for performing the second analysis based at least in part on the location.

19. The method of claim 14, further comprising:

setting the priority for analysis based at least in part on a deviation between a first inference based on the first analysis and an additional inference based on the second analysis, wherein the second entity belongs to a same class of entities as the first entity.

20. The computer-implemented method of claim 14, further comprising:

determining that the second entity is related to the first entity by at least identifying a statistical correlation between an attribute of the first entity and an attribute of the second entity.

* * * * *